US010275431B2

(12) United States Patent
Phuah et al.

(10) Patent No.: US 10,275,431 B2
(45) Date of Patent: *Apr. 30, 2019

(54) METHODS AND SYSTEMS FOR PROVIDING WEB PAGES TO WEB BROWSERS

(71) Applicant: Verizon Patent and Licensing Inc., Arlington, VA (US)

(72) Inventors: Vincent T. Phuah, Waltham, MA (US); James Edward Paschetto, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 956 days.

This patent is subject to a terminal disclaimer.

(21) Appl. No.: 14/334,845

(22) Filed: Jul. 18, 2014

(65) Prior Publication Data

US 2014/0331122 A1 Nov. 6, 2014

Related U.S. Application Data

(63) Continuation of application No. 10/714,324, filed on Nov. 14, 2003, now Pat. No. 8,788,932.

(51) Int. Cl.
| | | |
|---|---|---|
| *G06F 17/00* | (2006.01) | |
| *G06F 17/22* | (2006.01) | |
| *G06F 17/30* | (2006.01) | |
| *H04L 29/06* | (2006.01) | |

(52) U.S. Cl.
CPC .... *G06F 17/2247* (2013.01); *G06F 17/30899* (2013.01); *H04L 69/28* (2013.01)

(58) Field of Classification Search
CPC .......................... G06F 17/2247; G06Q 30/0277
USPC ......................... 715/200, 234, 235
See application file for complete search history.

(56) References Cited

U.S. PATENT DOCUMENTS

| | | | |
|---|---|---|---|
| 5,999,912 A | 12/1999 | Wodarz et al. | |
| 6,128,651 A | 10/2000 | Cezar | |
| 6,161,127 A * | 12/2000 | Cezar .................... | G06Q 30/02 709/203 |
| 6,339,761 B1 | 1/2002 | Cottingham | |
| 6,442,529 B1 | 8/2002 | Krishnan et al. | |
| 6,487,538 B1 | 11/2002 | Gupta et al. | |
| 6,584,492 B1 * | 6/2003 | Cezar .................... | G06Q 30/02 709/203 |
| 6,636,247 B1 * | 10/2003 | Hamzy .................. | G06Q 30/02 705/14.73 |
| 6,826,614 B1 | 11/2004 | Hanmann et al. | |
| 7,103,904 B1 | 9/2006 | Blackketter et al. | |
| 7,962,604 B1 * | 6/2011 | Morris ................... | G06Q 30/02 705/14.4 |
| 8,788,932 B1 | 7/2014 | Phuah et al. | |
| 2002/0007419 A1 | 1/2002 | Chang et al. | |
| 2002/0010626 A1 | 1/2002 | Agmoni | |

(Continued)

*Primary Examiner* — Manglesh M Patel

(57) ABSTRACT

Methods and systems described herein can allow for a service provider, such as an Internet Service Provider (ISP) to provide Web pages to users' Web browsers at periodic intervals. The content can include graphics, text, audio and video clips. In contrast to the traditional banner or pop-up advertisements available today, the methods and systems can allow content Web pages to be displayed on users' Web browsers without the user requesting specific Web sites. The ISPs can become distributors of advertising content, potentially gaining new revenue streams.

20 Claims, 3 Drawing Sheets

(56) References Cited

U.S. PATENT DOCUMENTS

| | | |
|---|---|---|
| 2002/0036654 A1 | 3/2002 | Evans et al. |
| 2002/0072972 A1 | 6/2002 | Lamont |
| 2002/0077900 A1 | 6/2002 | Thompson et al. |
| 2002/0143627 A1 | 10/2002 | Barsade et al. |
| 2002/0194070 A1 | 12/2002 | Totham et al. |
| 2003/0009762 A1 | 1/2003 | Hooper et al. |
| 2003/0048294 A1 | 3/2003 | Arnold |
| 2005/0096983 A1 | 5/2005 | Werkhoven |

* cited by examiner

METHODS AND SYSTEMS FOR PROVIDING WEB PAGES TO WEB BROWSERS

RELATED APPLICATION

This application is a continuation of U.S. patent application Ser. No. 10/714,324, filed Nov. 14, 2003 (now U.S. Pat. No. 8,788,932), the disclosure of which is incorporated herein by reference.

FIELD

The systems and methods relate to displaying web pages, and more particularly to providing web pages to web browsers.

BACKGROUND

The concept of advertising on the Internet is well known. Since the inception of Internet portal Web sites, popular portals have used banner and pop-up ads as a source of revenue. The main goal of such Internet portal Web sites can be to attract large numbers of users to access their Web sites. Advertisers can pay the Internet portals based on the number of times an advertisement, or ad is displayed to the users accessing their Web sites, known in the art as impressions.

Thus, an advertiser can rely on users accessing the portal Web sites to have the ads seen by the users. Since different users can access different portals, an advertiser can place ads with a number of Internet portals in order to get the advertising message across to a large Internet user population. However, there remain portals that do not support advertising and an advertiser can miss the segment of the Internet population using such portals.

SUMMARY

Methods and systems can allow for a service provider to provide content Web pages to users' Web browsers at periodic intervals. The content Web pages can include graphics, text, audio and video clips. In contrast to the traditional banner or pop-up ads available today, the methods and systems can allow content Web pages to be displayed on users' Web browsers without the user requesting specific Web sites. The service providers can become distributors of content, such as advertising, potentially gaining new revenue streams.

In one embodiment, a method of providing a Web page to a Web browser can include receiving a request for a first Web page, retrieving a content Web page, sending the content Web page to the browser for display on the browser for a predetermined period, retrieving the first Web page when the predetermined period is exceeded, and sending the first Web page to the browser for display. The method can include saving the request and retrieving the stored request to determine retrieval information for retrieving the first Web page. The content Web page can replace the Web page displayed by the browser, or can overlay the Web page displayed by the browser in the manner of known pop-up displays.

The method can include retrieving and sending the content Web page based on whether the request is received during a content interval. When the first Web page is retrieved after retrieving and sending the content Web page, the content interval can be reset. An indication of the status of the content interval can be provided to the browser. The method can include retrieving and sending the content Web page when the first Web page is not exempted. In one aspect, the method can include retrieving and sending the content Web page if the first Web page is non-exempt and/or if the request is received during a content interval.

The method can include selecting a template form for the content Web page to generate the content Web page. Configuration data can be obtained from users and the template form can be selected based on the configuration data obtained. The method can include determining when the predetermined period is exceeded based on a triggering event, including such events as completion of a presentation on the content Web page, selection of an action specified on the content Web page, and the expiration of a specified time period. Triggering data can be obtained from the triggering event and can be incorporated with the configuration data.

In one embodiment, computer-readable medium can contain instructions for controlling a computer system to provide a Web page to a Web browser by controlling the computer system to receive a request for a first Web page, retrieve a content Web page, send the content Web page to the browser for display of the content Web page for a predetermined period, retrieve the first Web page when the predetermined period is exceeded, and send the first Web page to the browser for display.

The instructions can include instructions to save and store the request and retrieve the stored request to determine retrieval information for retrieving the first Web page. The instruction can control the computer system to determine when the predetermined period is exceeded based on a triggering event. The triggering event can include one or more events, such as completion of a presentation on the content Web page, selection of an action specified on the content Web page, and expiration of a specified time period.

The instructions can include controlling the computer system to retrieve and send the content Web page if the first Web page is non-exempt and/or if the request is received during a content interval. The instructions can control the computer system to provide an indication of a status of the content interval to the browser for display. In addition, the instructions can control the computer system to obtain user configuration data, and select a template form for the content Web page based on the configuration data. Data obtained from the triggering event can be incorporated with the configuration data. The instructions to send the content Web page can include instructions to replace a Web page displayed by the browser with said content Web page, or to overlay the content Web page on the Web page displayed by the browser.

In one embodiment, a Web-based server application on computer-readable medium can include instructions to provide content Web pages to a Web browser at predetermined intervals by determining if a request for a first Web page from the Web browser is received during the predetermined interval, obtaining a template form when the request is received during the predetermined interval, generating a content Web page from the template form, sending the content Web page to the Web browser for display of the content Web page for a predetermined period, retrieving the first Web page when the predetermined period is exceeded, and sending the first Web page to the Web browser for display.

The application can include instructions to determine when the predetermined period is exceeded based on a triggering event. The triggering event can include events such as completion of a presentation on the content Web page, selection of an action specified on the content Web page, and expiration of a specified time period. The application can generate the content Web page by obtaining user configuration data, and selecting a template form for the content Web page based on the configuration data. Data from the triggering event can be incorporated with the configuration data.

In one embodiment, a method of providing Web pages can include receiving a request for a first Web page, determining if the request is received during a predetermined interval, retrieving a content Web page when the request is received during the predetermined interval, providing the content Web page in response to the request when the request is received during the predetermined interval, receiving an indication that the display of the content Web page is complete, and providing the first Web page upon receipt of the indication.

The indication can include completion of a presentation on the content Web page, selection of an action specified on the content Web page, and expiration of a specified time period. The method can include providing a status indication relative to the predetermined interval to the browser for display. The method can include obtaining user configuration data, and selecting a template form for the content Web page based on the configuration data.

In one embodiment, a system for advertising over a network can include a proxy server connected to the network to receive requests from a network user to access a requested site on the network, a plurality of template forms for the advertising, determining means to determine if the request is received within a predetermined interval, generating means to generate an advertising site from one of the template forms and to present the advertising site to the user when the request is received within the predetermined interval, tracking means to monitor the presentation of the advertising site and to determine when the presentation is complete, and processing means to present the requested site to the user when the presentation is complete. The system can include windowing means to present a status indication relative to the predetermined interval to the user.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Figure 3A:
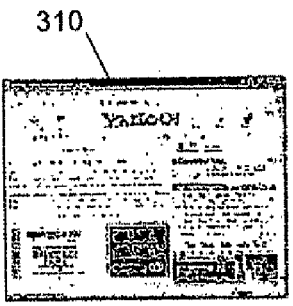
FIGS. 3A-3C illustrate a series of screen images on a Web browser.
Figure 3B:
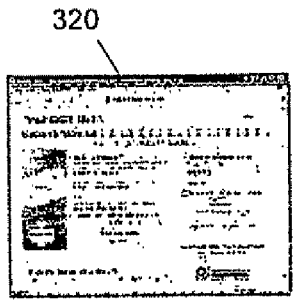
Figure 3C:
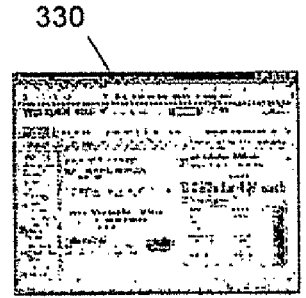

The methods and systems described herein can be used to provide Web pages to a user's Web browser at selected time intervals. In one embodiment, the Web pages provided can include advertisement Web pages, though it can be understood that other Web pages can be provided, e.g., user notices, system messages, etc. FIGS. 3A-3C illustrate an exemplary sequence of screen images, labeled screens 310, 320 and 330, that a service provider, such as an Internet Service Provider (ISP) can present to a user based on the user's request to view the Web pages shown in the screen images. The screen images 310, 320 and 330 in FIGS. 3A-3C are intentionally shown blurred to illustrate Web pages without disclosing the actual content thereof.

The Web pages can be provided by or accessed from a variety of servers on the Internet. References herein to the Internet can accordingly be understood to include portions thereof, including but not limited to intranets, local area networks (LANs), wide area networks (WANs), etc. Further, references herein to a service provider or ISP can be understood to include other such entities capable of performing the aspects of the disclosed methods and systems attributable herein to an ISP, e.g., system administrators, network servers, etc.

Figure 1:
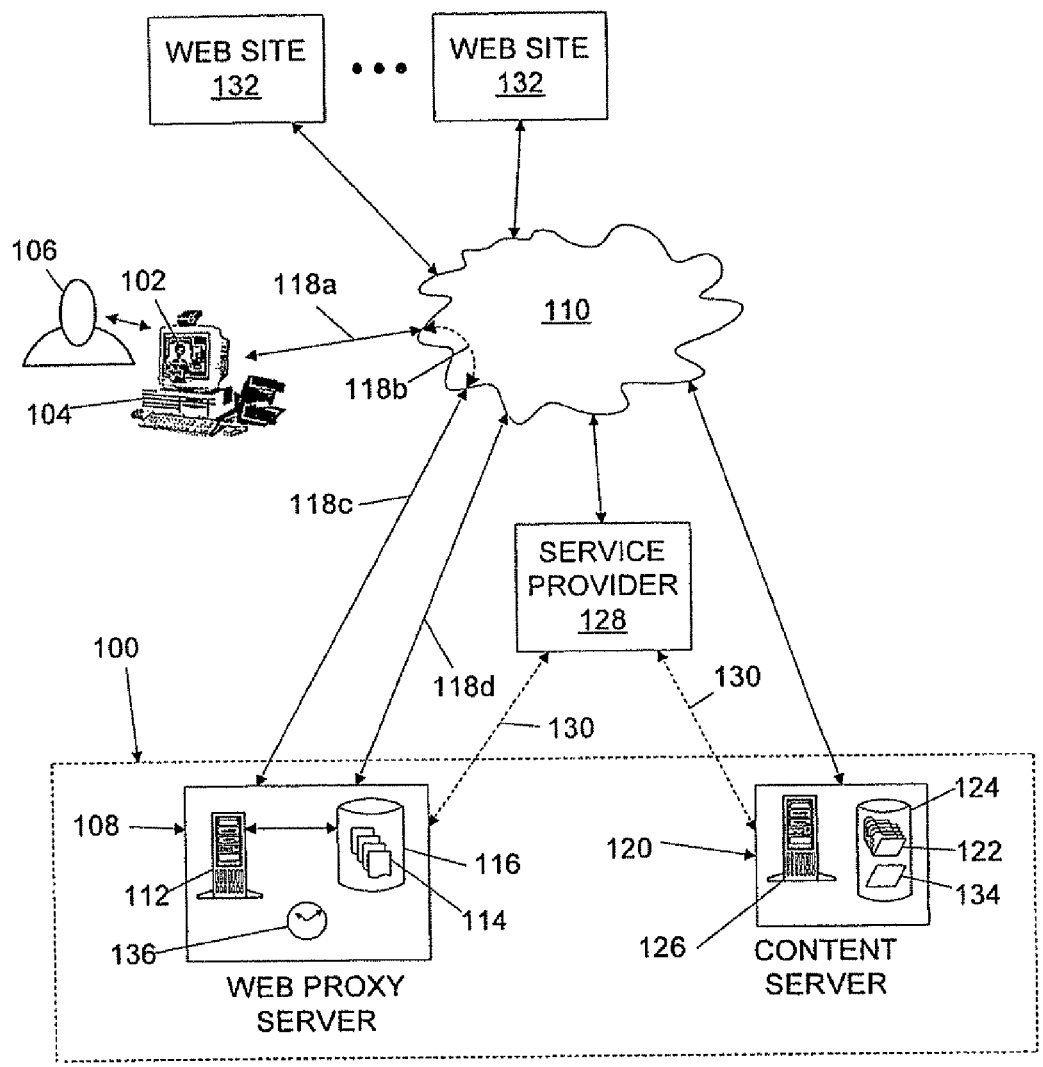
FIG. 1 illustrates a block diagram of a system for providing Web pages to a user's Web browser.

Referring to FIG. 1, there is shown a block diagram of a system 100 that can provide Web pages to browser 102 running on processor 104 of user 106. System 100 can include one or more Web proxy servers 108 connected to a network 110, such as the Internet. Proxy server 108 can include a processor 112 that can execute one or more sets of instructions, or programs 114 contained on storage medium 116. Proxy server 108 can act as a mediator between Web browser 102 and network 110. Thus, the user connection to network 110, as shown by arrows 118a-d, can include a connection 118a from user processor 104 to network 110, a connection 118b through network 110 directly to the connection 118c from network 110 to proxy server 108 and the connection 118d from proxy server 108 to network 110. Connections 118c and 118d can be configured as a single connection and connections 118c and 118d can be shown as separate connections in FIG. 1 for illustrative purposes.

In one embodiment, proxy server 108 can be configured in the manner of known Web servers in that proxy server 108 can receive and process requests from Web browsers such as browser 102. Depending on the workload experienced by proxy server 108, one or more execution instances of proxy server 108 can be used. Instructions or programs 114 of proxy server 108 can include load-balancing techniques for distributing the workload across the execution instances. In one embodiment, proxy server 108 can include a network device, such as a router. However, it can be understood that proxy server 108 can perform application layer packet inspection and process Web network traffic using Hypertext Transfer Protocol (HTTP) and/or other protocols for processing requests from users.

One or more content servers 120 of system 100 can include template forms 122 on storage medium 124, from which processor 112 of proxy server 108 can generate a Web page. It can be understood that proxy servers 108 can be configured to include content servers 120. In one embodiment, content server 120 can include processor 126 for processing requests for Web pages and generating the Web pages. In one embodiment, service provider 128 can establish proxy servers 108 and content servers 120, as indicated by dashed arrows 130 in FIG. 1, to mediate its customers' access to network 110 and provide Web pages to its customers, such as user 106.

Figure 2:
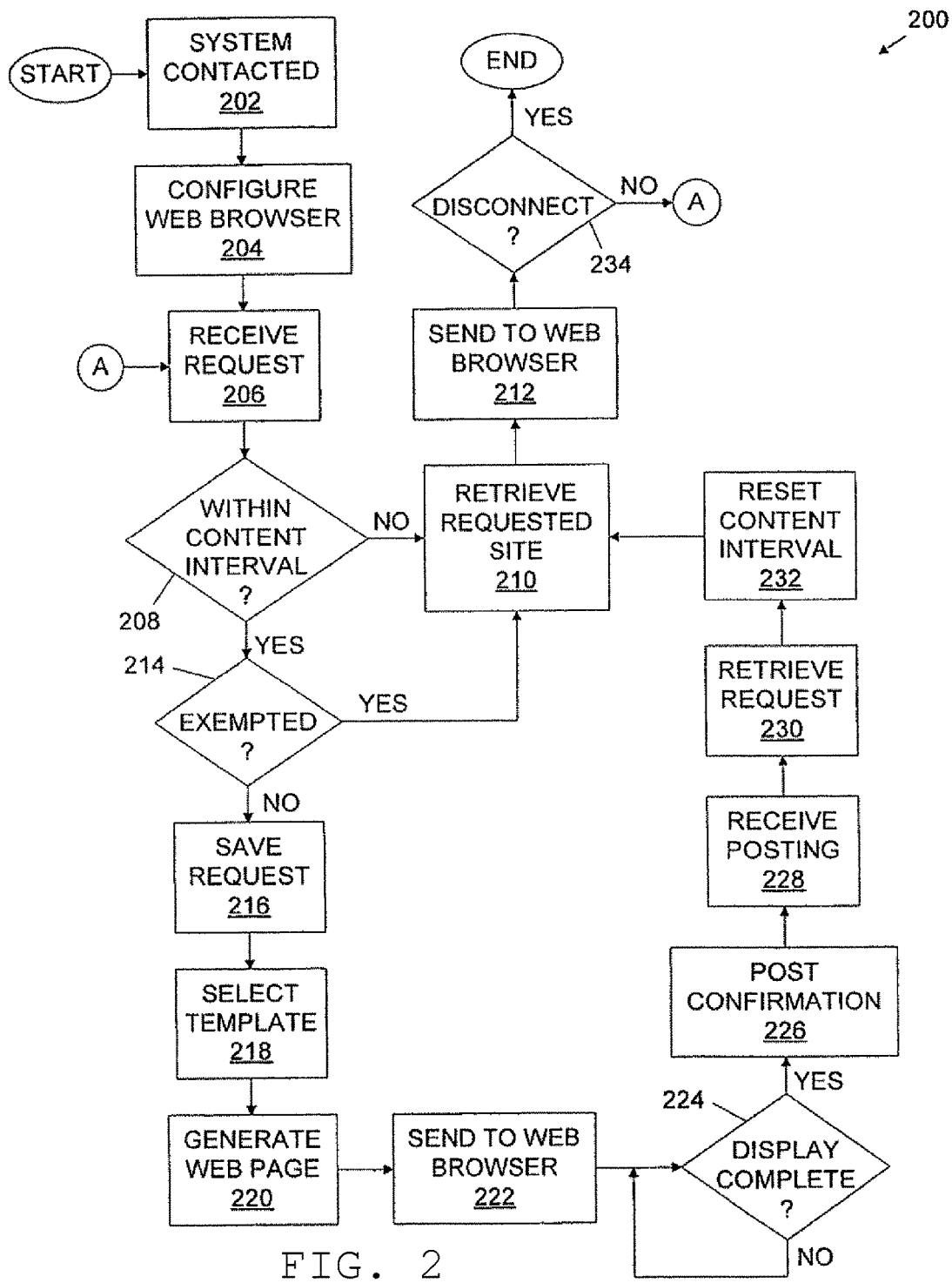
FIG. 2 illustrates a flow chart of a method implemented by the system of FIG. 1.

FIG. 2 illustrates a flow chart for a method 200 to generate and provide Web pages to a Web browser using the system 100. Method 200 can start when user 106 contacts (202) service provider 128 to utilize service provider 128 for access to Web sites 132 on network 110. Service provider 128 can facilitate configuration (204) of Web browser 102 for user 106 to address Web proxy server 108. In one embodiment, processor 104 can execute an application provided by service provider 128 for contacting service provider 128 and configuring browser 102.

Once Web browser 102 is configured to use Web proxy server 108, data traffic to and from Web browser 102 can pass through Web proxy server 108, where processor 112 can alter the data flow to provide Web pages to browser 102. Proxy server 108 can receive a request, e.g., for a URL, from user 106 to access a Web page or site, as at 206. Method 200 can determine (208) whether the Web site request arrived within a predetermined content interval. The content interval can include a measure or value defined in the Web proxy server for user 106, which can indicate when a Web page can be provided to browser 102.

In one embodiment, the measure can include a time value that can correspond to the minimum time period between providing Web pages to browser 102. As an example, the content interval can be 15 minutes when proxy server 108 receives an initial request from a user. Within a 15 minute time period from the request, proxy server 108 can allow Web page requests to be processed by the respective servers for the requested Web sites 132, similar to user 106 accessing the network 110 without using Web proxy server 108. When 15 minutes have elapsed, a request can trigger system 100 to provide a Web page based on a template form 122 from content server 120.

Other time measures can be used, including average time between provisions and maximum time between provisions. Measures other than time measures can be used, including ratios of provided content Web pages to URL accessed Web sites. For example, one content Web page can be provided for every ten URL accessed Web sites or pages. In one embodiment, the measure can correspond to receiving a request for a predetermined Web site, with every request being checked to determine if the predetermined site is requested. The measures for Web pages accessed from within a single domain (e.g., accessing site xyz1.com/first from xyz1.com/second in the xyz1.com domain) can be different from the measures for Web pages accessed by changing domain (e.g., accessing site xyz1./first from abc2.com). For example, the measure for Web pages accessed from within a single domain can be a time measure, while the measure for Web pages accessed by changing domains can be a ratio, as previously described. In another example, the ratio for Web pages accessed from within a single domain can be different from the ratio for Web pages accessed by changing domains.

Time and other measures can be combined, such that more than one measure can trigger provision of a content Web page. The measures can be different for different users and can be dynamically changed for a user. For example, during configuration, a user can choose a range of services from service provider 128 from a low cost service with a short time interval between Web page provisions to a high priced service with long time intervals between Web page provisions. Web proxy server 108 can maintain a state that defines whether the content interval is active or non-active for the user based on the time value or content interval.

If the request did not arrive during a content interval, proxy server 108 can retrieve (210) the requested Web site from network 110 and send (212) the requested Web site or page to browser 102 of user 106. If the request arrived during a content interval, method 200 can determine (214) if the requested Web site is exempted from having a Web page provided prior to the requested Web site or page. If the requested Web site or page is exempted, method 200 can proceed to 210 to retrieve the Web site or page.

Exempted Web sites or pages can include Web sites or pages so designated by user 106 during configuration, or so designated by system 100 based on criteria determined by system 100. For example, system 100 can exempt the Web sites of companies providing content to service provider 128, such that user 106 is not interrupted while accessing those Web sites. In another example, the content Web page can contain a link to another Web site and/or page that can be exempted.

If the request arrived during a content interval and the requested Web site is not exempted, proxy server 108 can save (216) the request and select (218) a content template form from content server 120. A content Web page can be generated (220) from the selected template and sent (222) to Web browser 102 of user 106. Hence, a content Web page can be displayed on Web browser 102 instead of the Web page requested by user 106. The template forms can be configured such that the content Web page can be specifically tailored to user 106 based on the configuration data 134 obtained from user 106. Such data can include demographic data, user preference data, and other data useful for marketing to user 106. In one embodiment, storage medium 124 can include configuration data 134.

The content Web page can be displayed on Web browser 102 until a predetermined trigger occurs. The trigger can include exceeding a predetermined time, the completion of an action associated with the content Web page, and/or performance of a specified act by user 106. For example, the content Web page can include a video clip and the content Web page can be displayed until the video clip is complete. As another example, the content page can provide user 106 with an option to purchase an item. The act of user 106 inputting purchase and payment information can trigger removal of the content Web page from browser 102.

In one embodiment, proxy server 108 can include a tracking device 136 (FIG. 1) that can monitor the content Web page for the occurrence of the trigger. For example, tracking device 136 can include a timer to determine when the predetermined time is exceeded. In one embodiment, the content Web page can contain JavaScript (a registered trademark of Sun Microsystems, Inc.) that can be initiated by the occurrence of the trigger, e.g., the completion of the video clip, an action by user 106, or some external event (e.g. the timer of tracking device 136), depending on the design of the content Web page.

When the display of the content Web page is complete, as determined at 224 by one of the above or another predetermined trigger, the JavaScript, or other set of instructions can post a confirmation to proxy server 108, or otherwise notify proxy server 108, as at 226. The posting can include time of access, actions taken by user 106, and/or other data that a content provider can use for marketing research or other purposes. The posting can be included with the configuration data 134 for use in generating the content Web page.

When proxy server 108 receives the posting (228), the saved request can be retrieved (230), the content period interval can be reset (232), and method 200 can return to 210 to retrieve the requested site and send the requested Web page to browser 102, as at 212. Method 200 can end when user 106 disconnects from proxy server 108, as determined at 234. Otherwise method 200 can await receipt of additional Web page or site requests, as indicated at "A".

The content Web page can include a combination of various media types such as audio and video clips, animated graphics, Macromedia Flash® (Macromedia, Inc.), on-line games, and Hypertext Markup Language (HTML). The video clips, audio clips, graphics, etc. can be stored with the templates 122 in content server 120. In one embodiment, processor 126 can serve as a videoserver and/or music server to stream video and/or audio content to Web browser 102. During configuration, system 100 can ensure that Web browser 102 can include appropriate media viewers and players to receive and play streaming video and/or audio content.

Figure 4A:
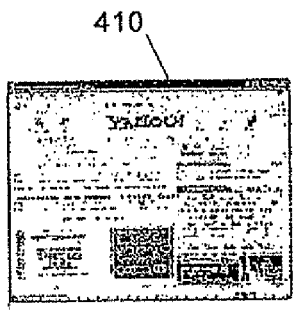
FIGS. 4A-4C illustrate a series of screen images on a Web browser including a Web page provided by the system of FIG. 1.
Figure 4B:
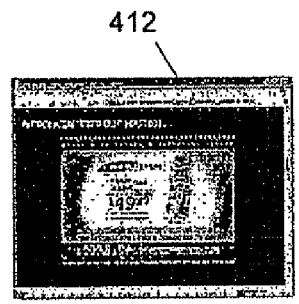
Figure 4C:
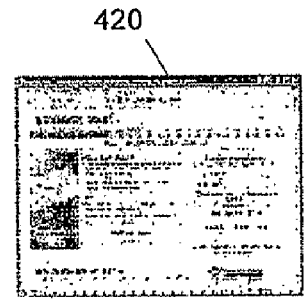

The content Web page can take a variety of forms, including an interposed content Web page and a pop-up content Web page, as known in the art. FIGS. 4A-4C illustrate a screen image sequence for an interposed content Web page. Screen 410 of FIG. 4A can correspond with screen 310 of FIG. 3A. When the request for a new Web page is received during the content period interval, e.g., a request for the Web page illustrated by screen 320 of FIG. 3B, the interposed Web page replaces the previous Web page of screen 410, as seen by screen 412 in FIG. 4B. When the display of the interposed Web page of screen 412 is complete, the requested Web page can be displayed, as indicated by screen 420 of FIG. 4C, corresponding with screen 320 of FIG. 3B.

Figure 5A:
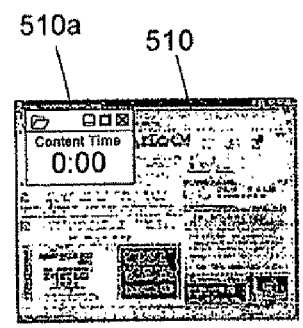
FIG. 5A-5C illustrate a series of screen images on a Web browser including a Web page overlay provided by the system of FIG. 1.
Figure 5B:
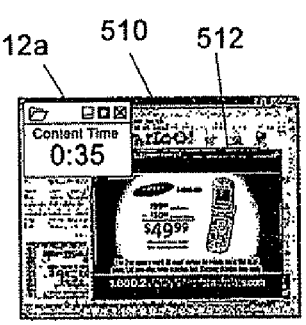
Figure 5C:
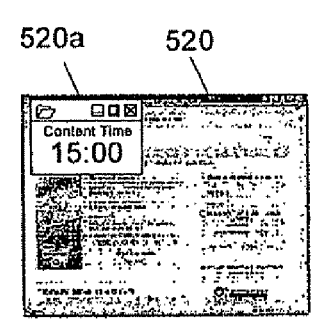

FIGS. 5A-5C illustrate a screen image sequence for a pop-up Web page. Screen 510 of FIG. 5A can correspond with screen 310 of FIG. 3A. When the request for a new Web page is received during the content period interval, e.g., a request for the Web page illustrated by screen 320 of FIG. 3B, the pop-up Web page screen 512 of FIG. 5B can overlay the Web page of screen 510. When the display of the pop-up Web page screen 512 is complete, the requested Web page can be displayed, as indicated by screen 520 of FIG. 5C, corresponding with screen 320 of FIG. 3B. Alternatively, when the request for a new Web page is received during the content period interval, the requested Web page can be displayed with Web page screen 512 overlaying Web page screen 520 until the display of pop-up Web page screen 512 is complete. As with screen images 310, 320 and 330 of FIGS. 3A-3C, the screen images in FIGS. 4A-4c (screen images 410, 412 and 420) and in FIGS. 5A-5C (screen images 510, 512 and 520) are intentionally shown blurred to illustrate Web pages without disclosing the actual content thereof.

In one embodiment, the content Web page can include a window to inform user 106 of the status of the content period interval, e.g., by showing the time remaining before the start of the next content period interval, the number of Web sites that can be accessed before the start of the next content period interval, and/or the time remaining until the content Web page is removed. As an example, FIG. 5A illustrates window 510a in screen 510, showing no time remaining, such that the next user request for a Web page or site will trigger method 200. In screen 510/512 of FIG. 5B, window 512a can indicate 0:35 remaining until the content Web page is complete and the user requested page is retrieved. In screen 520, window 520a can indicate 15:00 remaining until a content Web page is provided. In another example, the time can be displayed in the system tray by properly configuring processor 104 of user 106, as known in the art. It can be understood that other means of tracking and displaying the time, as may be known in the art can be utilized with system 100.

System 100 and method 200 can enable service provider 128 to become a distributor of content, including advertising content, similar in that regard to current Web content providers. However, the systems and methods described herein can provide a number of improvements and/or advantages over current systems and methods for providing content over a network, and particularly advertising content.

First, the systems and methods described herein can afford the ability to provide a content Web page to the user's Web browser at predetermined time intervals independent of the Web site being accessed by the user. Unlike current systems implementing banner advertisements requiring the user to access a specific Web site before the banner can be displayed, Web proxy server 108 can determine which content to display and under what circumstances they can be displayed, independent of the user's action.

In addition, method 200 can determine at 224 whether a content Web page has been viewed in its entirety. The template forms 222 can provide targeted content and the timing of providing the content can be customized for the user. Users' experience with television commercials can prepare them for the provision of the content web pages. The systems and methods can operate on a variety of networks, including networks supporting the Internet Protocol (IP), broadband networks, DSL (Digital Subscriber Line), FLIP (Fiber to the Premise), and WiFi (a wireless network specification).

The systems and implementations thereof described herein may not be limited to particular components or configurations. For example, system 100 can be distributed among a number of network nodes that can communicate and cooperate over network 110, such as an intranet and/or the Internet, to provide users with a seamless interface experience. In addition, browser 102 can be configured to operate on a number of devices capable of accessing system 100 through network 110, including personal computers, wireless phones, PDA's and the like.

Processors 104, 112 and/or 126 can include volatile memory and non-volatile memory, e.g., storage medium 116 and 124, for storing data, such as template forms 122, and other data corresponding to input and output values and other intermediate computations for the method 200. The memory can include instructions for executing the method 200, which can be transferred, in the course of operation, from the non-volatile memory to the volatile memory and to the processor for execution.

Additionally, the flow chart of FIG. 2 can illustrate an exemplary implementation of method 200 and other configurations can be contemplated and/or other actions, decisions, menus and the like can be included, as for example the provision of windows 510a, 512a and 520a described herein. Also, it can be understood that processors 104, 112, and/or 126 can include and/or be combined into one or more processors for interfacing with user 106, service provider 128, and the like, and for performing method 200. Further, it can be understood that storage medium 116 and/or 124 can be combined and/or distributed among one or more storage mediums accessible by processors 104, 112 and/or 126.

The systems and methods described herein may not be limited to a particular hardware or software configuration; they may find applicability in many computing or processing environments. They can be implemented in hardware or software, or a combination thereof. Preferably, method 200 can be implemented in computer programs executing in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating'memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method comprising:
   receiving, by a computer system, a request for a web page;
   providing, by the computer system, a content web page to a user device,
      the content web page being provided for display, via a browser of the user device, for a specified period of time, and
      the content web page including a link to another web page when a provider of the requested web page is exempted from having the content web page being provided for the specified period of time;
   determining, by the computer system, that the request was received during a content interval,
      the content interval being a predetermined interval where the content web page is provided to the user device within the content interval;
   determining, by the computer system, an occurrence of a triggering event,
      the triggering event occurring when
         a particular action, that is specified on the content web page, is performed by a user;
   determining, by the computer system, a next content period interval,
      the next content period interval being determined based upon the particular action performed by the user;
   providing, by the computer system and to the user device, the web page based on the occurrence of the triggering event; and
   generating, by the computer system, an indication for display on the web page indicating a time remaining before start of the next content period interval.

2. The method of claim 1,
   where providing the content web page includes:
      providing the content web page to the user device based on the request being received during the content interval.

3. The method of claim 1, further comprising:
   determining that the web page corresponds to a predetermined web page; and
   where providing the content web page includes:
      providing the content web page to the user device based on the web page corresponding to the predetermined web page, and
      where the content web page is not provided for web pages that do not correspond to the predetermined web page.

4. The method of claim 1, where the web page comprises a first web page, the method further comprising:
   determining whether the first web page and a second web page are associated with a same domain; and
   where providing the content web page includes:
      selectively providing the content web page based on whether the first web page and the second web page are associated with the same domain.

5. The method of claim 1, where providing the content web page includes:
   providing a video to the user device.

6. The method of claim 1, further comprising:
   obtaining data associated with the user;
   selecting a template for generating the content web page based on the data; and
   generating the content web page based on the template.

7. The method of claim 1, where providing the content web page includes:
   determining to provide the content web page based on first information associated with the user.

8. A device comprising:
   one or more memories; and
   one or more processors, communicatively coupled to the one or more memories, to:
      receive a request for a web page from a user device;
      provide a content web page to the user device for a specified period of time, the content web page including a link to another web page when a provider of the requested web page is exempted from having the content web page being provided for the specified period of time,
the content web page including information identifying an action;
determine that the request was received during a content interval,
the content interval being a predetermined interval where the content web page is provided to the user device within the content interval;
determine that the action has been performed;
determine a next content period interval,
the next content period interval being determined based upon the action performed by the user;
provide the web page to the user device based on the action having been performed; and
generate an indication for display on the web page indicating a time remaining before start of the next content period interval.

9. The device of claim 8,
where, when providing the content web page, the one or more processors are to:
selectively provide the content web page to the user device based on whether the request was received during the content interval,
the content web page being provided to the user device when the request was received during the content interval, and
the content web page not being provided when the request was not received during the content interval.

10. The device of claim 9, where, when determining whether the request was received during the content interval, the one or more processors are to:
determine a ratio based on a quantity of content web pages provided to the user device and a quantity of web pages accessed by the user device, and
determine whether the request was received during the content interval based on the ratio.

11. The device of claim 8, where the one or more processors are further to:
determine whether the web page and another web page, previously provided to the user device, are associated with a same domain; and
where, when providing the content web page, the one or more processors are to:
selectively provide the content web page based on whether the web page and the other web page are associated with the same domain.

12. The device of claim 8, where, when providing the content web page, the one or more processors are to:
stream, to the user device, one or more of:
video content, or
audio content.

13. The device of claim 8, where, when determining that the action has been performed, the one or more processors are to:
receive a notification from the user device; and
determine that the action has been performed based on the notification.

14. The device of claim 13, where the content web page includes a set of instructions that causes the notification to be sent to the device when the action has been performed.

15. A non-transitory computer-readable medium storing instructions, the instructions comprising:
one or more instructions that, when executed by a processor, cause the processor to:
receive a request for a web page from a user device;
provide a content web page to the user device for display via a browser of the user device,
the content web page specifying a particular action associated with providing the web page for display, and
the content web page including a link to another web page when a provider of the requested web page is exempted from having the content web page being provided for a specified period of time;
determine that the request was received during a content interval,
the content interval being a predetermined interval where the content web page is provided to the user device within the content interval;
determine a selection of the particular action specified by the content web page;
determine a next content period interval,
the next content period interval being determined based upon the selection of the particular action specified by the content web page;
provide, to the user device, the web page based on the selection of the particular action; and
generate an indication for display on the web page indicating a time remaining before start of the next content period interval.

16. The non-transitory computer-readable medium of claim 15, where the instructions further comprise:
one or more instructions that, when executed by the processor, cause the processor to:
determine a completion of a presentation on the content web page; and
where the one or more instructions to provide the web page include:
one or more instructions that, when executed by the processor, cause the processor to:
provide the web page further based on the completion of the presentation.

17. The non-transitory computer-readable medium of claim 15, where the one or more instructions to provide the content web page include:
one or more instructions that, when executed by the processor, cause the processor to:
provide an advertisement to the user device.

18. The non-transitory computer-readable medium of claim 15, where the one or more instructions to provide the content web page include:
one or more instructions that, when executed by the processor, cause the processor to:
determine that the web page is associated with a company that provides content to a service provider; and
provide the content web page to the user device based on the web page not being associated with the company.

19. The non-transitory computer-readable medium of claim 15, where the web page comprises a first web page, the instructions further comprising:
one or more instructions that, when executed by the processor, cause the processor to:
determine whether the first web page and a second web page are associated with a same domain; and
where the one or more instructions to provide the content web page include:

one or more instructions that, when executed by the processor, cause the processor to:
selectively provide the content web page to the user device based on whether the first web page and the second web page are associated with the same domain.

20. The non-transitory computer-readable medium of claim 15, where the one or more instructions to provide the content web page include:
one or more instructions that, when executed by the processor, cause the processor to:
provide, to the user device, one or more of:
video content, or
audio content.

* * * * *